United States Patent
Siram et al.

(10) Patent No.: US 11,494,558 B2
(45) Date of Patent: Nov. 8, 2022

(54) CONVERSION OF SCRIPT WITH RULE ELEMENTS TO A NATURAL LANGUAGE FORMAT

(71) Applicant: NETIQ CORPORATION, Houston, TX (US)

(72) Inventors: Sriram Priyatham Siram, Bangalore (IN); Prashanth Sutrave, Bangalore (IN); Amit Suresh Prabhu, Bangalore (IN); Apoorv Rastogi, Bangalore (IN); Akshatha Kadri, Bangalore (IN)

(73) Assignee: NETIQ CORPORATION, Houston, TX (US)

( * ) Notice: Subject to any disclaimer, the term of this patent is extended or adjusted under 35 U.S.C. 154(b) by 417 days.

(21) Appl. No.: 16/735,235

(22) Filed: Jan. 6, 2020

(65) Prior Publication Data
US 2021/0209302 A1 Jul. 8, 2021

(51) Int. Cl.
G06F 40/284 (2020.01)
G06F 40/289 (2020.01)
G06F 40/205 (2020.01)

(52) U.S. Cl.
CPC .......... G06F 40/284 (2020.01); G06F 40/205 (2020.01); G06F 40/289 (2020.01)

(58) Field of Classification Search
CPC ..... G06F 40/284; G06F 40/205; G06F 40/289
USPC ............................................................. 704/9
See application file for complete search history.

(56) References Cited

U.S. PATENT DOCUMENTS

| | | |
|---|---|---|
| 7,127,641 B1 | 10/2006 | Anderson |
| 7,769,736 B2 | 8/2010 | Vella |
| 8,769,346 B2 | 7/2014 | Sijelmassi |
| 8,789,140 B2 | 7/2014 | Williams et al. |
| 9,098,558 B2 | 8/2015 | Arshad et al. |
| 9,535,904 B2 | 1/2017 | Prokofyev et al. |
| 10,127,201 B2 | 11/2018 | Dettman et al. |
| 2007/0009161 A1 | 1/2007 | Hollingsworth |
| 2009/0070327 A1 | 3/2009 | Loeser et al. |

(Continued)

FOREIGN PATENT DOCUMENTS

| | | |
|---|---|---|
| CN | 102622215 A | 8/2012 |
| CN | 103577174 A | 2/2014 |

OTHER PUBLICATIONS

Xiao, et al., "Automated Extraction of Security Policies from Natural-Language Software Documents".

(Continued)

*Primary Examiner* — Thierry L Pham

(57) ABSTRACT

An apparatus may include a processor that may be caused to access a script in a first format, the script comprising a rule element having a condition element that specifies conditional logic and an action element that specifies an action to be taken based on the conditional logic, build a condition object for the condition element, generate, based on the condition object, a condition sentence portion that represents the conditional logic in a natural language format, build an action object for the action element, generate, based on the action object, an action sentence portion that represents the action to be taken in the natural language format, and generate, in the natural language format, a natural language sentence for the rule element based on the condition sentence portion and the action sentence portion.

20 Claims, 6 Drawing Sheets

(56) References Cited

U.S. PATENT DOCUMENTS

2017/0239576 A1* 8/2017 Hsiao .................... A63F 13/63
2019/0102438 A1 4/2019 Murray et al.

OTHER PUBLICATIONS

Keeney, J.,"Chisel-A policy driven, Context aware dynamic adaption framework", IEEE, Oct. 18, 2019.
NETIQ; Identity Manager, Understanding Policies; https://www.netiq.com/documentation/identity-manager-47/policy_understanding/data/what-are-identity-manager-policies.html; Feb. 2018; 70 pages.
Novell—NsureTM Identity Manager; https://www.novell.com/, May 4, 2005.
"XML interface for quick & easy content aggregate & Integartion of multi Gds into your travel system", Oct. 18, 2019.

* cited by examiner

500

```
ACCESS AN EXTENSIBLE MARKUP LANGUAGE (XML) SCRIPT
COMPRISING A PLURALITY OF XML ELEMENTS, THE PLURALITY OF XML
ELEMENTS COMPRISING A FIRST XML ELEMENT AND A SECOND XML
ELEMENT
502
```

↓

```
DETERMINE THAT THE FIRST XML ELEMENT RELATES TO A CONDITION
504
```

↓

```
GENERATE A CONDITION SENTENCE PORTION BASED ON THE FIRST
XML ELEMENT AND THE DETERMINATION THAT THE FIRST XML ELEMENT
RELATES TO THE CONDITION
506
```

↓

```
DETERMINE THAT THE SECOND XML ELEMENT RELATES TO AN ACTION
ASSOCIATED WITH THE CONDITION
508
```

↓

```
GENERATE AN ACTION SENTENCE PORTION BASED ON THE SECOND
XML ELEMENT AND THE DETERMINATION THAT THE SECOND XML
ELEMENT RELATES TO AN ACTION
510
```

↓

```
GENERATE A NATURAL LANGUAGE SENTENCE BASED ON THE
CONDITION SENTENCE PORTION AND THE ACTION SENTENCE PORTION
512
```

*FIG. 5*

```
┌─────────────────────────────────────────────────────┐
│              MACHINE-READABLE MEDIUM                │
│                       600                           │
│  ┌───────────────────────────────────────────────┐  │
│  │  ACCESS A SCRIPT IN A FIRST FORMAT, THE SCRIPT│  │
│  │  COMPRISING A RULE ELEMENT HAVING A CONDITION │  │
│  │  ELEMENT THAT SPECIFIES CONDITIONAL LOGIC AND │  │
│  │  AN ACTION ELEMENT THAT SPECIFIES AN ACTION   │  │
│  │  TO BE TAKEN BASED ON THE CONDITIONAL LOGIC   │  │
│  │                    602                        │  │
│  └───────────────────────────────────────────────┘  │
│                                                     │
│  ┌───────────────────────────────────────────────┐  │
│  │  GENERATE A CONDITION SENTENCE PORTION BASED  │  │
│  │          ON THE CONDITION ELEMENT             │  │
│  │                    604                        │  │
│  └───────────────────────────────────────────────┘  │
│                                                     │
│  ┌───────────────────────────────────────────────┐  │
│  │  GENERATE AN ACTION SENTENCE PORTION BASED ON │  │
│  │              THE ACTION ELEMENT               │  │
│  │                    606                        │  │
│  └───────────────────────────────────────────────┘  │
│                                                     │
│  ┌───────────────────────────────────────────────┐  │
│  │  GENERATE, IN A SECOND FORMAT, A SENTENCE FOR │  │
│  │   THE RULE ELEMENT BASED ON THE CONDITION     │  │
│  │ SENTENCE PORTION AND THE ACTION SENTENCE      │  │
│  │                  PORTION                      │  │
│  │                    608                        │  │
│  └───────────────────────────────────────────────┘  │
└─────────────────────────────────────────────────────┘
```

FIG. 6

CONVERSION OF SCRIPT WITH RULE ELEMENTS TO A NATURAL LANGUAGE FORMAT

BACKGROUND

Data transformations may be used when various systems use different data formats or use different content of data. For example, identity management may include data transformations for various sites to identify and authenticate user identities and/or for controlling system access to resources.

BRIEF DESCRIPTION OF THE DRAWINGS

Features of the present disclosure may be illustrated by way of example and not limited in the following figure(s), in which like numerals indicate like elements, in which:

FIG. 5 depicts a flow diagram of an example method of converting scripts with rule elements to a natural language format; and FIG. 6 depicts a block diagram of an example non-transitory machine-readable storage medium of converting scripts with rule elements to a natural language format.

DETAILED DESCRIPTION

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Identity management systems may use scripts that encode logic for automating data transformations and other identity management operations. For example, users may encode transformation logic in extensible markup language ("XML") scripts, which, while plain text, may not be easy to read or understood by a human. Other types and formats of these scripts may be used as well. Thus, an entity (in particular, information technology personnel of the entity) that uses scripts for data transformations used in identity management may be unable to easily understand the transformation logic the entity uses. The foregoing may necessitate inefficient script generation and maintenance, which may lead to inefficient identity management operations.

Disclosed herein are apparatuses and methods for automatically generating natural language versions of scripts used for data transformations. For example, an apparatus may be improved to convert a script from a first format to a second format. The first format may include markups, spacing, and other formatting that may be difficult to comprehend. The second format may include a natural language format that is easy to comprehend and maintain by a human user. In some examples, the data transformations may be used for identity management operations. As such, a human user may be able to view, maintain, and generate scripts in an easier to comprehend format, improving automated identity management systems and other systems that use automated data transformation logic.

Figure 1:
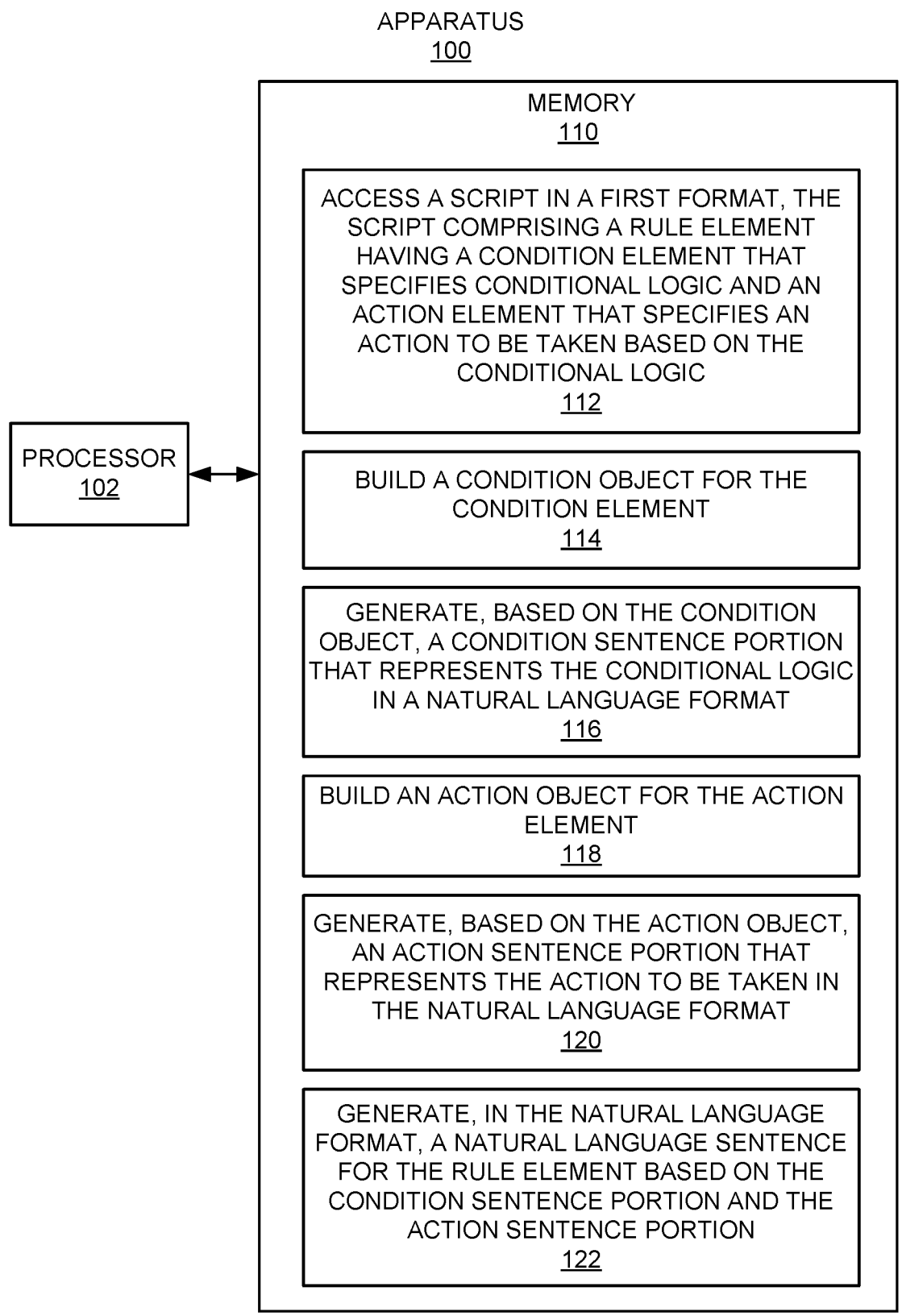
FIG. 1 depicts a block diagram of an example apparatus that converts scripts with rule elements to a natural language format.

FIG. 1 depicts a block diagram of an example apparatus 100 that converts scripts with rule elements to a natural language format. The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scope of the apparatus 100 disclosed herein.

The apparatus 100 may include a memory 110 that may have stored thereon machine-readable instructions (which may also be termed computer readable instructions) 112-122 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. It should be understood that the example apparatus 100 depicted in FIG. 1 may include additional features and that some of the features described herein may be removed and/or modified without departing from the scope of the example apparatus 100.

Figure 2:
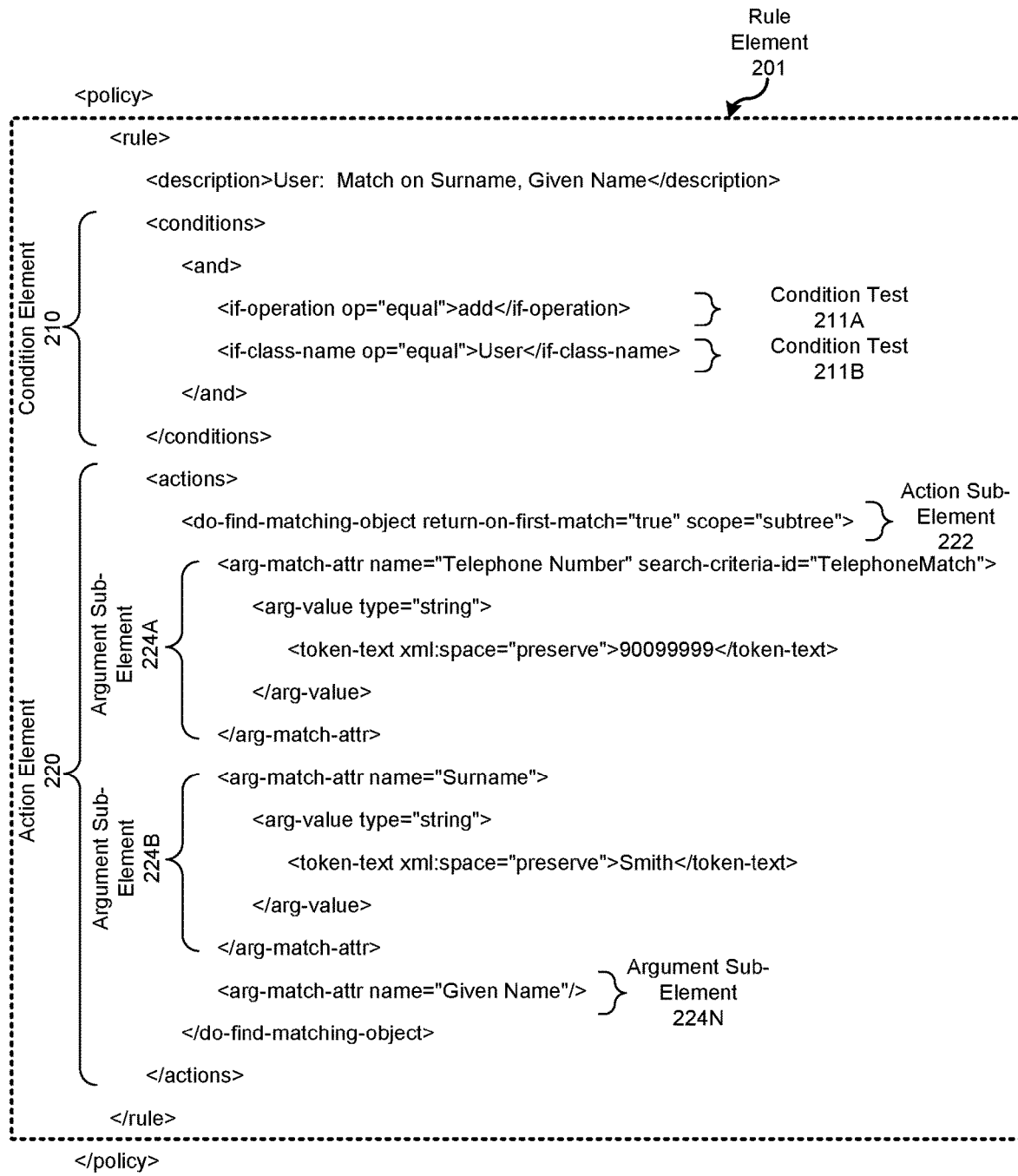
FIG. 2 depicts an example of a rule element of a script.

The description of the apparatus 100 of FIG. 1 will also refer to FIG. 2, which depicts an example of a rule element 201 of a script. In some examples, as illustrated in FIG. 2, the script may be generated according to a markup language for data transformation, such as the DIRXML Script is provided by NETIQ, although other formats and/or languages may be used as well. Referring to FIG. 2, the script may encode a policy 200. The policy 200 may include rule element(s) that each encode logical rules to be executed. For example, as illustrated, the policy 200 may include a rule element 201, although as noted above, a given policy may include multiple rule elements. As such, the script may include other rule elements as well (not shown). The rule element 201 may be parsed by a machine but may be difficult to comprehend by a human user, particularly if the human user is unfamiliar with the first format. In some examples, the rule element 201 may include a condition element 210 that specifies conditional logic and an action element 220 that specifies an action to be taken based on the conditional logic. The action element 220 may include an action sub-element 222 and argument sub-element(s) 224 (illustrated as argument sub-elements 224A-N). The action sub-element 222 may specify an action to be performed (subject to the conditional logic of the condition element 210). An argument sub-element 224 may specify an argument (input) for the action to be performed. It should be understood that the example in FIG. 2 is described for illustrative purposes. Other rule elements, portions of rule elements, and format/language of the script may be used.

Returning to FIG. 1, the processor 102 may fetch, decode, and execute the instructions 112 to access a script in a first format. The script may include a rule element, such as rule element 201. The rule element may include a condition element, such as condition element 210, that specifies conditional logic and an action element, such as action element 220, that specifies an action to be taken based on the conditional logic.

The processor 102 may fetch, decode, and execute the instructions 114 to build a condition object for the condition element. For example, the processor 102 may (through fetched, decoded and executed instructions, such as instructions 114) parse the condition element 210 from the rule element 201. In some examples, the condition element 210 may include a plurality of tokens. Each token of the plurality of tokens may represent a respective part of the conditional logic. In some examples, the condition element 210 may include condition test(s), such as condition tests 211A and 211B. In these examples, the plurality of tokens may refer to a respective condition test 211. For example, each condition test 211 may include a respective set of a plurality of tokens. When more than one condition test 211 is present, the condition tests may be joined together by a condition joiner, such as "<and>" or "<or>." When joined by the "<and>" condition joiner, all condition tests may need to be satisfied in order for the action specified by the action element 220 to be executed. On the other hand, if condition tests are joined by an "<or>" condition joiner, then either of the condition test(s) or group of condition tests may be satisfied in order for the action specified by the action element 220 to be executed, As illustrated, condition tests 211A and 211B are joined by the condition joiner "<and>" in which case the condition tests 211A and 211B must both be satisfied in order for the action specified by the action element 220 to be executed.

To illustrate, referring to FIG. 2, the condition element 210 may include condition tests 211A and 211B. The condition tests 211A and 211B may each include a plurality of tokens. For example, the condition test 211A may include a plurality of tokens such as a condition phrase ("if-operation"), a left-hand operator ("operation"—(the value after the "if-" prefix)), an operator phrase ("op=equal"), a right-hand operator ("add"—the value within the if tag)), and/or other tokens. The condition test 211B may include a plurality of tokens such as a condition phrase ("if-class-name"), a left-hand operator ("class-name"), an operator phrase ("op=equal"), a right-hand operator ("User"), and/or other tokens. Because the condition tests 211A and 211B are joined by the "<and>" condition joiner, the condition specified by the condition element may read: "if operation equals 'add' and class-name equals 'User'".

In some examples, the processor 102 may extract the plurality of tokens from the condition element 210. Some tokens may have an associated value that is part of the token name. For example, referring to the condition test 211A the "condition phrase" token may have a value of "if-operation" in the script. Other tokens may have an associated value that is encoded as a key=value pair. For example, a value of the "operator phrase" token may be encoded as "op='equal'" in which the value of the operator phrase token may be encoded as "equal" in the script.

In some examples, the processor 102 may store the tokens and their respective values using the condition object. For example, the condition object may include a data structure that stores tokens and their respective values parsed from the condition element 210. The data structure may store names of the tokens in association with respective values of the tokens, as illustrated in Table 1A:

TABLE 1A condition object {
    condition phrase = value of condition phrase
    left-hand operand = value of left-hand operand
    operator phrase = value of operator phrase
    right-hand operand = value of right-hand operand
    misc = value of miscellaneous data
}

In particular, the data structure of the condition object parsed from the condition element 210 (in particular the condition test 211A of the condition element 210) may be represented according to Table 1B:

TABLE 1B condition object {
    condition phrase = if-operation
    left-hand operand = "operation"
    operator phrase = "equal"
    right-hand operand = "add"
    misc = [not illustrated]
}

It should be noted that the data structure may include an ordering of the tokens in the condition object such that the tokens are to be processed in order. It should be further noted that token parsing (such as an indication of the nomenclature of the tokens, order of the tokens, how the tokens store their values, and overall structure of the condition element) may be predefined in or otherwise accessed by the instructions executed by the processor 102. As such, the processor 102 may be able to recognize, order, and parse the tokens.

The processor 102 may fetch, decode, and execute the instructions 116 to generate, based on the condition object, a condition sentence portion that represents the conditional logic in a natural language format. In some examples, the condition sentence portion may include a natural language format that is different from the format of the condition element 210 in the script. The natural language format may be structured and worded, for example, in a lexical format that is understandable to human users, the natural language format may, for example, be free from tags, labels, and spacing of the script that otherwise makes the script difficult to read and understand by a human user.

In some examples, to generate the condition sentence portion, the processor 102 may map tokens and respective token values to a natural language format. Table 2 below illustrates an example mapping of the tokens and respective values illustrated in Table 1B.

TABLE 2

Example mapping based on the condition object generated from the condition element 210. In particular, Table 2 is illustrated using the condition tests 211A and 211B:
<if-operation op="equal">add</if-operation>
<if-class-name op="equal">User</if-class-name>

| Token and Token Value | Definition Reference | Mapped Result |
|---|---|---|
| condition phrase = if-operation | If-operation = "if the" | If the |
| left-hand operand = "operation" | Parse the condition phrase | "operation" |
| operator phrase (op) = "equal" | equal = "is equal to" | is equal to |
| right-hand operand (element value) = "add" | No mapping, pass through value only | "add" |
| | "and" condition joiner | |
| condition phrase = if-class-name | If-class-name = "if the" | If the |
| left-hand operand (class-name) = "class-name" | Parse the condition phrase | class-name |
| operator phrase (op) = "equal" | equal = "is equal to" | is equal to |
| right-hand operand (element value) = "User" | No mapping, pass through value only | User |

In some examples, a definition reference may store associations between token values and words or phrases to be used and/or instructions for mapping. In some examples, the instructions may indicate that "no mapping" is to be performed such that the value is to be passed without mapping to a word or phrase or format. For example, depending on the type of token and the definition reference, the processor 102 may perform the mapping or may simply pass through only the value or entire phrase of the token.

To illustrate, the processor 102 may map a first ("first as in a label, not necessarily order") token of the plurality of tokens to a first word or phrase. The condition sentence portion may be generated based on the first word or phrase. Referring to Table 2, the value "if-operation" of the "condition phrase" token parsed from the condition test 211A may be mapped to the word or phrase "if the operation." In some examples, the processor 102 may use a second token of the plurality of tokens without mapping the second token to another corresponding word or phrase. For example, value "operation" of the left-hand operand token may be passed without mapping. The condition sentence portion may be based further on the second token. In some examples, the processor 102 may use a third token literally. In these examples, the processor 102 may not recognize the third token and may simply pass a string corresponding to the third token. For example, some tokens may encode key=value pairs that may be passed without mapping to another word or phrase (and in some examples without recognizing what this refers to). In this example, a key=value pair may be included in the condition sentence portion even if not recognized in the definition reference. As such, the apparatus 100 may be improved to tolerate script elements that may not be expressly recognized.

In some examples, to generate the condition sentence portion, the processor 102 may join the first word or phrase with the second token. For example, the processor 102 may concatenate the mapped result (whether actual mapping or passing through has occurred) corresponding to each of the token values of the condition structure. The joining (such as concatenating) may be based on ordered tokens to maintain an order of the tokens in the condition element. For example, referring to Table 2, the tokens may be ordered in the following order:

"condition phrase"+"left-hand operand"+"operator phrase" "right-hand operand"+any key=value pairs.

The processor 102 may concatenate the mapped results according to the order as follows (referring to condition test 211A:

"if the"+"operation" "equals"+"add".

The condition sentence portion may therefore be "if the operation is equal to add." In some examples, an unrecognized tag such as a key=value pair may be concatenated onto the condition sentence portion and/or presented separately to the user (such as via a user interface). For condition elements that include more than one condition test, the condition tests may be concatenated together using the condition joiner. For example, the condition test 211B may be processed in a manner similar to the condition test 211A to generate the phrase: "If the class-name is equal to User". The phrases may be joined to generate the condition sentence portion "if the operation is equal to add and if the class-name is equal to User", It should be noted that the condition phrase may be parsed to recognize condition words such as "if", "while", and others that start a condition phrase. What follows the condition words may be parsed to identify the left-hand operand (such as "operation" from the condition phrase "if-operation").

The processor 102 may fetch, decode, and execute the instructions 118 to build an action object for the action element 220. The action object may also be referred to herein as a Tokenized Action Object ("TAO") representation. The TAO representation may include a data structure that stores the action to be performed, as parsed from the action sub-element 222, and associated argument(s), as parsed from the argument sub-element(s) 224. Table 3 illustrates an example action object.

TABLE 3

```
action object (TAO representation) {
    Action token = string parsed from action sub-element 222
    Argument list = array of argument(s) parsed from argument sub-element(s) 224
}
```

In some examples, the processor 102 may recognize and parse an action sub-element 222 based on pattern-matching. For example, the processor 102 may recognize that sub-elements beginning with "do*" (where * denotes a wildcard) represent an action sub-element. In this example, with reference to Table 3 and FIG. 2, the Action token of the action sub-element 222 may be "do-find-matching-object". In some examples, the action sub-element 222 may further include other logical instructions such as "return-on-first-match" and "scope." These further instructions may further specify the actions encoded in the action element 220.

In some examples, the processor 102 may likewise recognize and parse an argument sub-element 224 based on pattern matching sub-elements that begin with "arg*". For example, when the processor 102 encounters an action sub-element 222, the processor may look for argument sub-elements 224A-N by parsing "arg*" tags and their associated token-text values. In some examples, the argument sub-element 224 may include further instructions as well, such as "search-criteria-id". The processor 102 may generate an array of strings in which each string in the array of strings correspond to a respective argument sub-element 224, For example, the processor 102 may generate a string based on an argument name and an argument value parsed from an argument sub-element 224. In particular, the processor 102 may join the argument name and the argument value with "equals" to generate the string "(argument name) equals (argument value)" for a given argument sub-element 224.

The processor 102 may parse the argument value from the "token-text" element of the argument sub-element 224, The argument name may be parsed in various ways. In some examples, an argument sub-element 224 may not include an attribute tag. In these examples, the processor 102 may parse the argument name based on the name encoded within the argument sub-element 224A itself. For example, argument sub-element 224A does not have a name attribute. As such, the processor 102 may parse the element name from the tag itself: "arg-match-attr." In this example, the processor 102 may parse the element name "match-attr" from the tag. In some examples, the processor 102 may map the element name (such as "match-attr") to a corresponding argument word or phrase. In these examples, the action sentence portion may be based further on the corresponding argument word or phrase. In some examples, the processor 102 may map the element name (such as "match-attr") to a corresponding argument word or phrase based on the definition reference (which may also be used to map action element data in a manner similar to the way in which the condition element is mapped).

In some examples, an argument sub-element 224 may include an attribute tag, such as "name" as illustrated by argument sub-elements 224B and 224N. In these examples, the processor 102 may parse the argument name from the name attribute. For example, the processor 102 may parse the argument name "Telephone Number" from argument sub-element 224A, "Surname" from argument sub-element 224B, and "Given Name" from argument sub-element 224N. As such, the processor 102 may generate strings "Telephone number equals 90099999" for argument sub-element 224A and "Surname equals Smith" for argument sub-element 224B.

Referring to Table 3 and FIG. 2, the processor 102 may build the action object for the action element 220 as follows:

```
action object (TAO representation) {
    Action token = do-find-matching object
    Argument list = ("Telephone Number equals 90099999", "Surname equals Smith")
}
```

Based on the action object, the processor 102 may fetch, decode, and execute the instructions 120 to generate an action sentence portion that represents the action to be taken in a natural language format. For example, the processor 102 may generate the action sentence portion based on the action token and the argument list of the action object. In some examples, the processor 102 may map the action sub-element 222 to a corresponding action word or phrase. In these examples, the action sentence portion may be based on the corresponding action word or phrase. To illustrate, the processor 102 may map a name parsed from the action sub-element 222 (the action token of the action object) to a corresponding action word or phrase. In particular, the processor 102 may map "do-find-matching-object" to the corresponding action or phrase "find a matching object."

In some examples, the processor 102 may generate an argument list based on the argument sub-element(s) 224. In these examples, the action sentence portion may be based further on the argument list, To generate the argument list, the processor 102 may use a first argument sub-element (224A) and a second argument sub-element (224B) and/or other argument sub-elements 224N. For example, the processor 102 may join the argument list with the word "and" to generate an argument list string "Telephone Number equals 90099999 and Surname equals Smith".

In some examples, the processor 102 may add a separator word or phrase between the corresponding action word or phrase and the argument list. For example, the processor 102 may add a separator word or phrase "where" in between the corresponding action word or phrase "find a matching object" and the argument list string "Telephone Number equals 90099999 and Surname equals Smith" in which case the action sentence portion will be "find a matching object where Telephone Number equals 90099999 and Surname equals Smith".

The processor 102 may fetch, decode, and execute the instructions 122 to generate, in the natural language format; a natural language sentence for the rule element based on the condition sentence portion and the action sentence portion. For example, the processor may generate a natural language sentence "if the operation is equal to add and the class-name is equal to User find a matching object where Telephone Number equals 90099999 and Surname equals Smith." In some examples, the processor 102 may add spacing, separators such as commas, or other formatting to the natural language sentence to improve readability.

Figure 3:
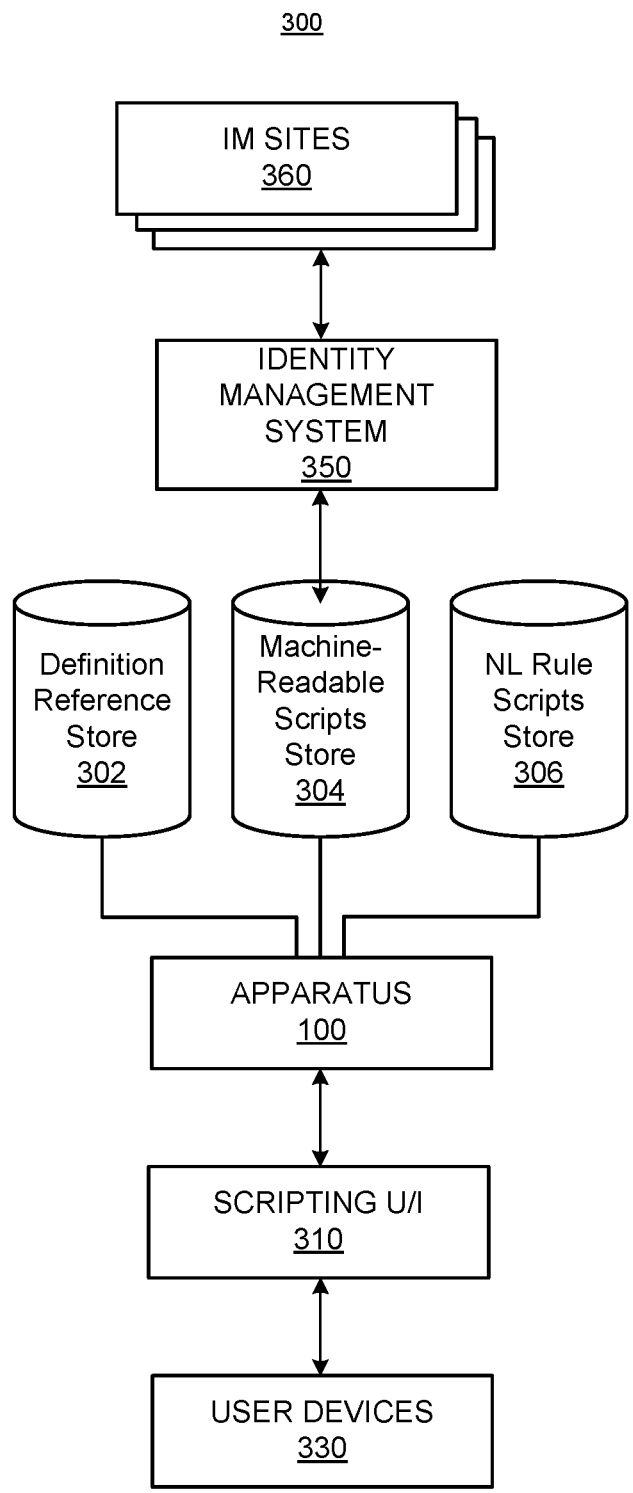
FIG. 3 depicts a block diagram of an example system for translating machine-readable scripts into natural language rule scripts for identity management.

FIG. 3 depicts a block diagram of an example system 300 for translating machine-readable scripts into natural language rule scripts for identity management. In some examples, the system 300 may include an identity management system (IMS) 350 that provides user identity management services to identity management (IM) sites 360. For example, each IM site 360 may use the IMS 350 to obtain user identity information, including authentication, access control, and/or other to perform other IM operations. To facilitate automated IM, the IMS 350 may access scripts, such as the scripts discussed above with respect to FIGS. 1 and 2, from the machine-readable scripts store 304. The scripts may encode logic for retrieving information for or otherwise executing the IM operations.

In some examples, the scripts stored in the machine-readable scripts store 304 may be specific for a given entity. For example, different entities, such as different companies or organizations, may use the system 300 to automate IM operations for their respective networks. In some examples, the various scripts may not be easily comprehended by a human user due to formatting, tagging; metadata, and/or other structure or feature of the scripts. As such, it may be difficult for a given entity to manage its automated IM operations by reviewing the scripts. In some examples, the apparatus 100 may generate, based on definition references stored in the definition reference store 302, natural language version of the scripts that are easier to comprehend by human users. The natural language versions may be stored in the NL rule scripts store 306. The scripting user interface (U/I) 310 may present the scripts and/or the natural language variants to human users via user devices 330. In this manner, the system 300 facilitates easy review of the scripts from machine-readable scripts store 304 by generating and providing natural language versions of the scripts (NL rule scripts).

Figure 4:
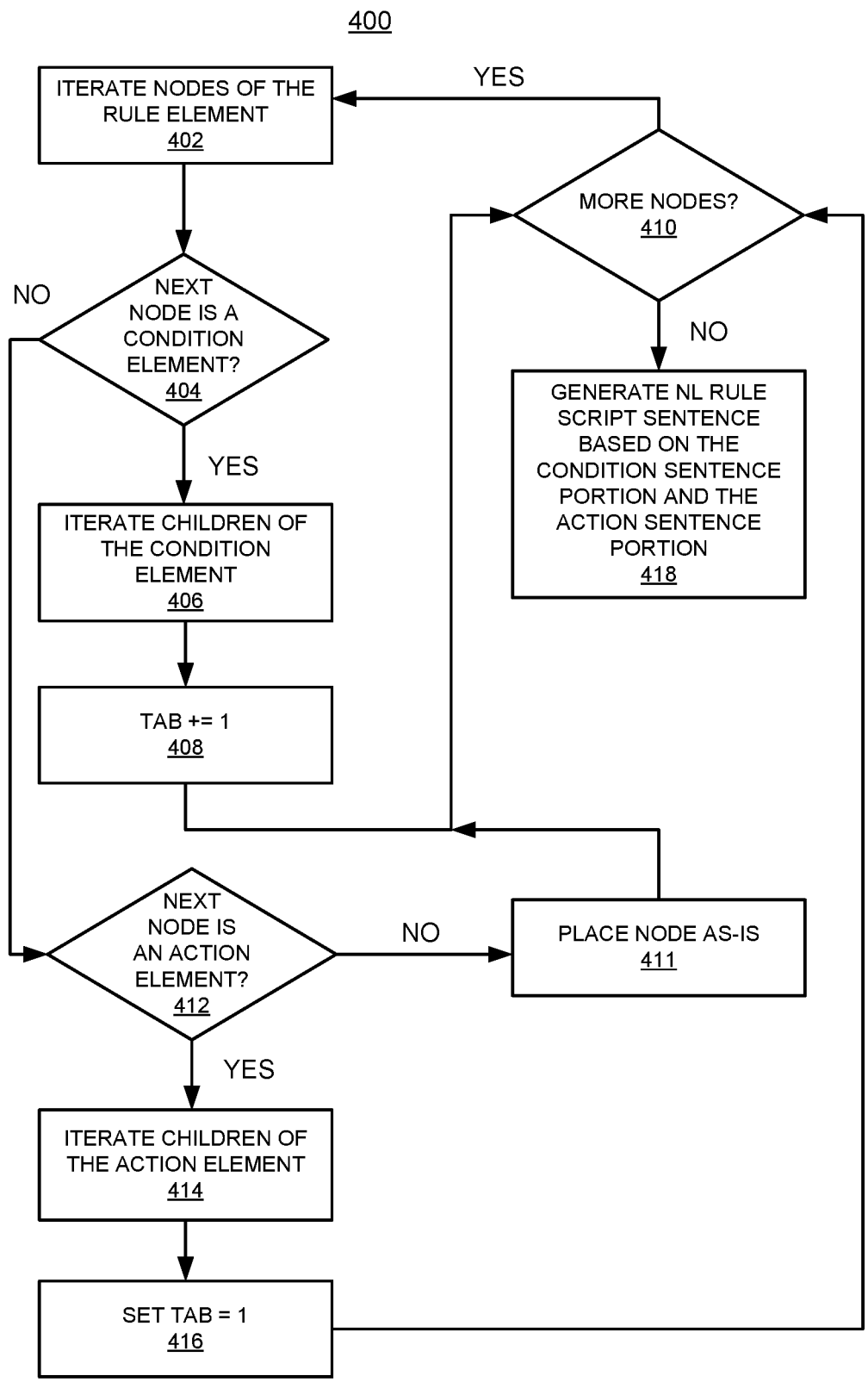
FIG. 4 depicts a flow diagram of an example method of parsing a script to generate a natural language version of the script.

Various manners in which the apparatus 100 may operate to convert scripts with rule elements to a natural language format are discussed in greater detail with respect to the methods 400 and 500 depicted in FIGS. 4 and 5, It should be understood that the methods 400 and 500 may each include additional operations and that some of the operations described therein may be removed and/or modified without departing from the scope of the methods. The description of the methods 400 and 500 may be made with reference to the features depicted in FIGS. 1-2 for purposes of illustration.

FIG. 4 depicts a flow diagram of an example method 400 of parsing a script to generate a natural language version of the script. At block 402, the method 400 may include iterating nodes of a rule element. The rule element may include a condition element and an action element. The condition element may be encoded in a node of the script and the action element may be encoded in another node of the script. In some examples, the nodes may be nodes of an XML or other hierarchically-arranged format. In some examples, the nodes may be encoded such that hey are identifiably condition elements or action elements.

At block 404, the method 400 may include determining whether a next node (an iterated node from among the nodes of the rule element) is a condition element. If the next node is a condition element, the method 400 may proceed to block 406.

At block 406, the method 400 may include iterating the children elements of the condition element. For example, the condition element may include nested nodes that encode information relating to the condition element. The nested nodes may include various conditions that are additive or alternative. For example, two nodes may be encoded as being additive through their respective node names. These two nodes may encode conditions that are joined together by an "and" statement. Another set of nodes may be encoded as being alternative, in which case they may be joined together by an "or" statement. In this manner, various types and combinations of conditional logic may be represented and parsed from the script. In some examples, block 406 may include converting the conditions to a condition sentence portion in a natural language format before or after joining. The converted conditions may be stored in a memory buffer for presentation as a natural language sentence. In some examples, the natural language sentence may be formatted with tabs or other formatting. In these examples, each converted set of conditions may be presented after a set number of tabs (such as after one tab), As such, at block 408, to maintain tab formatting, an initial tab value of 0 may be incremented by 1 so that a node that is a condition element starts after a tab. In other words, conditions may be printed or displayed on a user interface after a tab to delineate from other conditions and actions of the condition.

At block 410, the method 400 may include determining whether more nodes are to be processed. If yes, the method 400 may return to block 402 to iterate (remaining) nodes of the rule element.

Returning to block 404, if the next node is not a condition element, the method may proceed to block 412. At block 412, the method 400 may include determining whether the next node is an action element. If yes, at block 414, the method 400 may include iterating child nodes of the action element. Such child nodes of the action element may encode various actions to be taken. The actions to be taken may be mapped to an action sentence portion. Since an action element follows a condition element, to maintain proper formatting, at block 416, the method 400 may include setting the tab value to 1 (or other default value). Setting the tab value back to 1 may reset formatting for the next condition element. Processing may proceed to operation 410, where a determination of whether more nodes to be processed may be made.

Returning to block 412, if the next node is not an action element, at block 411, the method 400 may place the node as-is (since this node may not be recognized, for example). Processing may then proceed to block 410. At block 410, if there are no more nodes to be processed, at block 418, the method 400 may include generating a natural language (NO) rule script sentence based on the condition sentence portion generated at block 406 and the action sentence portion generated at block. The method 400 may be used by a processor, such as processor 102, to iterate over a script to parse condition and action elements, and generate a natural language sentence, FIG. 5 depicts a flow diagram of an example method 500 of converting scripts with rule elements to a natural language format. In some examples, the script may be formatted in extensible markup language (XML). At block 502, the processor 102 may access an XML script comprising a plurality of XML elements, the plurality of XML elements comprising a first XML element and a second XML element At block 504, the processor 102 may determine that the first XML element relates to a condition. For example, the first XML element may encode conditional logic.

At block 506, the processor 102 may generate a condition sentence portion based on the first XML element and the determination that the first XML element relates to the condition. For example, the processor 102 may convert information from the first XML element to a condition sentence portion. In some examples, the first XML element may include a plurality of tokens. Each token of the plurality of tokens may represent a part of the condition. For each token among the plurality of tokens, the processor 102 may determine a respective natural language fragment. Each natural language fragment may be part of the condition sentence portion. For example, the processor 102 may join the respective natural language fragments determined from the plurality of tokens to generate the condition sentence portion. In some examples, the processor 102 may map a token to a natural language fragment or use the token as-is without the mapping.

At block 508, the processor 102 may determine that the second XML element relates to an action associated with the condition. At block 510, the processor 102 may generate an action sentence portion based on the second XML element and the determination that the second XML element relates to an action. For example, to generate the action sentence portion, the processor may extract an action sub-element from the second XML element and map the action sub-element to a corresponding action word or phrase. The processor 102 may generate the action sentence portion based on the corresponding action word or phrase.

In some examples, the second XML element may include an argument sub-element. To generate the action sentence portion, the processor 102 may generate an argument list based on the argument sub-element. The action sentence portion may be based further on the argument list. In some examples, the action element may include a second argument sub-element. To generate the argument list, the processor 102 may generate the argument list based further on the second argument sub-element.

At block 512, the processor 102 may generate a natural language sentence based on the condition sentence portion and the action sentence portion. For example, the processor 102 may join the condition sentence portion and the action sentence portion to generate the natural language sentence.

Some or all of the operations set forth in each of the methods 400 and 500 may be included as utilities, programs, or subprograms, in any desired computer accessible medium. In addition, the methods 400 and 500 may be embodied by computer programs, which may exist in a variety of forms. For example, some operations of each of the methods 400 and 500 may exist as machine-readable instructions, including source code, object code, executable code or other formats. Any of the above may be embodied on a non-transitory machine-readable (such as computer-readable) storage medium. Examples of non-transitory machine-readable storage media include computer system RAM, ROM, EPROM, EEPROM, and magnetic or optical disks or tapes. It is therefore to be understood that any electronic device capable of executing the above-described functions may perform those functions enumerated above.

FIG. 6 depicts a block diagram of an example non-transitory machine-readable storage medium 600 of converting scripts with rule elements to a natural language format.

The machine-readable instructions 602 may cause the processor to access a script in a first format, the script comprising a rule element having a condition element that specifies conditional logic and an action element that specifies an action to be taken based on the conditional logic.

The machine-readable instructions 604 may cause the processor to generate a condition sentence portion based on the condition element. In some examples, to generate the condition sentence portion, the instructions may further cause the processor to parse one or more sub-elements from the condition element, build a condition structure based on the one or more sub-elements, determine, for each sub-element of the one or more sub-elements, a corresponding word or phrase in the second format, and join the corresponding word or phrase of each sub-element.

The machine-readable instructions 606 may cause the processor to generate an action sentence portion based on the action element. In some examples, to generate the action sentence portion, the instructions may further cause the processor to parse one or more action sub-elements from the action element, build an action object based on the one or more action sub-elements, determine, for each action sub-element of the one or more action sub-elements, a corresponding action word or phrase in the second format, and join the corresponding action word or phrase of each action sub-element. In some examples, the action element may include an argument sub-element. In these examples, to generate the action sentence portion, the instructions may further cause the processor to generate an argument list based on the argument sub-element. The action sentence portion may be based further on the argument list.

The machine-readable instructions 608 may cause the processor to generate, in a second format, a sentence for the rule element based on the condition sentence portion and the action sentence portion. For example, the processor may generate the sentence by joining the condition sentence portion and the action sentence portion.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a non-transitory machine-readable medium storing instructions that when executed by the processor, cause the processor to:
   access a computer programming script comprising a rule element having a machine-readable condition element that specifies conditional logic and a machine-readable action element that specifies an action to be performed based on the conditional logic;
   convert the machine-readable condition element of the rule element into a natural-language condition sentence portion, including causing the processor to parse the machine-readable condition element to identify condition tokens including a condition phrase, a left-hand operand, an operator phrase, and a right-hand operand, map values of the identified condition tokens to natural-language words, and join the mapped words into the natural-language condition sentence portion;
   convert the machine-readable action element of the rule element into a natural-language action sentence portion, including causing the processor to parse the machine-readable action element to identify action tokens, map values of the identified action tokens to natural-language phrases, and join the mapped phrases into the natural-language action sentence portion; and
   combine the natural-language condition sentence portion and the natural-language action sentence portion to generate a natural-language rule sentence that represents the rule element of the computer programming script.

2. The apparatus of claim 1, wherein the instructions further cause the processor to build a condition object from the machine-readable condition element, including causing the processor to:
   parse the machine-readable condition element to identify the condition tokens including the condition phrase, the left-hand operand, the operator phrase, and the right-hand operand;
   extract the values of the identified condition tokens from the machine-readable condition element; and
   store the values of the identified condition tokens and names of the identified condition tokens in a data structure of the condition object.

3. The apparatus of claim 2, wherein to generate the natural-language condition sentence portion, the instructions further cause the processor to:
   extract a first value of a first condition token from the condition object; and in response to determining that the first value of the first condition token is recognized, map the first value of the first condition token to a first word or phrase, wherein the natural-language condition sentence portion is generated based on the first word or phrase.

4. The apparatus of claim 3, wherein to generate the natural-language condition sentence portion, the instructions further cause the processor to:
extract a second value of a second condition token from the condition object; and
in response to determining that the second value is unrecognized, use the second value of the second condition token as is without mapping the second value of the second condition token to another corresponding word or phrase, wherein the natural-language condition sentence portion is based further on the second value.

5. The apparatus of claim 4, wherein to generate the natural-language condition sentence portion, the instructions further cause the processor to join the first word or phrase with the second value.

6. The apparatus of claim 1, wherein the machine-readable action element comprises an action sub-element, and wherein to generate the natural-language action sentence portion, the instructions further cause the processor to:
parse the machine-readable action element to identify the action sub-element based on pattern-matching with an action-root word; and
map a value of the action sub-element to a corresponding action word or phrase, wherein the natural-language action sentence portion is based on the corresponding action word or phrase.

7. The apparatus of claim 6, wherein the machine-readable action element comprises a first argument sub-element, and wherein to generate the natural-language action sentence portion, the instructions further cause the processor to:
generate an argument list based on the first argument sub-element, wherein the natural-language action sentence portion is based further on the argument list.

8. The apparatus of claim 7, wherein to generate the natural-language action sentence portion, the instructions further cause the processor to:
add a separator word or phrase between the corresponding action word or phrase and the argument list.

9. The apparatus of claim 7, wherein the machine-readable action element comprises a second argument sub-element, and wherein to generate the argument list, the instructions further cause the processor to:
generate the argument list based further on the second argument sub-element.

10. The apparatus of claim 9, wherein the instructions further cause the processor to:
map the second argument sub-element to a corresponding argument word or phrase, wherein the natural-language action sentence portion is based further on the corresponding argument word or phrase.

11. A method, comprising:
accessing, by a processor, an extensible markup language (XML) script comprising a rule element that includes a first XML element and a second XML element;
determining, by the processor, that the first XML element relates to a condition of the rule element;
in response to the determination that the first XML element relates to the condition of the rule element, generating, by the processor, a natural-language condition sentence portion based on the first XML element, including parsing the first XML element to identify condition tokens including a condition phrase, a left-hand operand, an operator phrase, and a right-hand operand, mapping values of the identified condition tokens to natural-language words, and joining the mapped words into the natural-language condition sentence portion;
determining, by the processor, that the second XML element relates to an action of the rule element associated with the condition;
in response to the determination that the second XML element relates to the action of the rule element, generating, by the processor, a natural-language action sentence portion based on the second XML element, including parsing the second XML element to identify action tokens, mapping values of the identified action tokens to natural-language phrases, and joining the mapped phrases into the natural-language action sentence portion; and
combining, by the processor, the natural-language condition sentence portion and the natural-language action sentence portion to generate a natural-language rule sentence that represents the rule element of the XML script.

12. The method of claim 11, further comprising building a condition object from the first XML element, including:
parsing the first XML element to identify the condition tokens including the condition phrase, the left-hand operand, the operator phrase, and the right-hand operand;
extracting the values of the identified condition tokens; and
storing the values of the identified condition tokens and names of the identified condition tokens in a data structure of the condition object.

13. The method of claim 11, wherein mapping the values of the identified condition tokens to the natural-language words comprises:
in response to a determination that a first value of a first condition token is recognized, mapping the first value of the first condition token to a first natural language word; and
in response to a determination that a second value of a second condition token is unrecognized, using the second value of the second condition token as is without mapping the second value to another natural language word.

14. The method of claim 11, wherein generating the natural-language action sentence portion comprises:
parsing the second XML element to identify an action sub-element based on pattern-matching, with an action-root word;
extracting a value of the action sub-element from the second XML element;
mapping the value of the action sub-element to a corresponding action word or phrase; and
generating the natural-language action sentence portion based on the corresponding action word or phrase.

15. The method of claim 14, wherein the second XML element comprises a first argument sub-element, and wherein generating the natural-language action sentence portion comprises:
generating an argument list based on the first argument sub-element, wherein the natural-language action sentence portion is based further on the argument list.

16. The method of claim 15, wherein the natural-language action sentence portion comprises a second argument sub-element, and wherein generating the argument list comprises:

generating the argument list based further on the second argument sub-element.

17. A non-transitory machine-readable medium storing instructions that when executed by a processor, cause the processor to:
- access a computer-programming script comprising a rule element having a machine-readable condition element that specifies conditional logic and a machine-readable action element that specifies an action to be taken based on the conditional logic;
- generate a natural-language condition sentence portion based on the machine-readable condition element, including causing the processor to parse the machine-readable condition element to identify condition tokens including a condition phrase, a left-hand operand, an operator phrase, and a right-hand operand, map values of the identified condition tokens to natural-language words, and join the mapped words into the natural-language condition sentence portion;
- generate a natural-language action sentence portion based on the machine-readable action element, including causing the processor to parse the machine-readable action element to identify action tokens, map values of the identified action tokens to natural-language phrases, and join the mapped phrases into the natural-language action sentence portion; and
- combine the natural-language condition sentence portion and the natural-language action sentence portion to generate a natural-language rule sentence that represents the rule element in the computer-programming script.

18. The non-transitory machine-readable medium of claim 17, wherein to generate the natural-language condition sentence portion, the instructions further cause the processor to:
- parse one or more condition sub-elements from the machine-readable condition element;
- build a condition structure based on the one or more condition sub-elements;
- determine, for each condition sub-element of the one or more condition sub-elements, a corresponding natural-language word or phrase; and
- join the corresponding natural-language words or phrases of the one or more condition sub-elements.

19. The non-transitory machine-readable medium of claim 18, wherein to generate the natural-language action sentence portion, the instructions further cause the processor to:
- parse one or more action sub-elements from the machine-readable action element based on pattern-matching with action-root words;
- build an action object based on the one or more action sub-elements;
- determine, for each action sub-element of the one or more action sub-elements, a corresponding natural-language action word or phrase; and
- join the corresponding natural-language action words or phrases of the one or more action sub-elements.

20. The non-transitory machine-readable medium of claim 19, wherein the machine-readable action element comprises an argument sub-element, and wherein to generate the natural-language action sentence portion, the instructions further cause the processor to:
- generate an argument list based on the argument sub-element, wherein the natural-language action sentence portion is based further on the argument list.

* * * * *